United States Patent Office 3,529,136
Patented Sept. 15, 1970

3,529,136
ARRANGEMENT FOR DIGITALLY ESTABLISHING A VALUE, PROVIDED WITH A FINE- AND A COARSE-READING SYSTEM
Rienk Pieter Offereins, Hengelo, Overijsel, Netherlands, assignor to N.V. Hollandse Signaalapparaten, Hengelo, Overijsel, Netherlands, a firm of the Netherlands
Filed June 20, 1966, Ser. No. 558,862
Int. Cl. H03k 13/02
U.S. Cl. 235—92    5 Claims

ABSTRACT OF THE DISCLOSURE

A device for digitizing a measurable quantity occurring after a marking pulse and between two electrical pulses, wherein a coarse counter and a fine counter are employed. One signal initiates counting, the second stops it. The coarse counter is accurately pre-set to a value somewhat below zero and, after counting is complete, certain stages thereof are compared with stages in the fine counter. Lack of correspondence causes adjustment of the coarse. Complemental operation is achieved by virtue of logic gating and is used where the second signal precedes the first.

---

This invention relates to an arrangement for digitally establishing a value utilizing a fine- and a coarse-reading system. In each system an electronic digital counter counts pulses during a recurrent time interval, between two electrical phenomena, the moment of occurrence of at least one of which phenomena is a function of the value to be established.

Arrangements of this type are well-known in the art of data-handling. The electrical phenomena are, as a rule, either pulses or corresponding edges of successive pulses or different edges of the same pulse. In many cases they are generated with the aid of synchronous transformers, adjusted according to the value to be established. In certain arrangements such a synchronous transformer is fed by polyphase current and supplies an alternating voltage with constant amplitude and a phase-angle that is a linear function of the position of the movable part of the synchronous transformer. In other arrangements of this type the mono-phase winding of such a synchronous transformer is fed by an alternating voltage, while the terminals of the poly-phase windings are connected to a network which derives an alternating voltage with a constant amplitude and a phase-angle that is a linear function of the position of the movable part of the synchronous transformer from the output voltages of the poly-phase windings of this transformer. An effective network for this purpose has been described in the U.S. Pat. 3,401,330 of the applicant. Pulses occurring at a moment which is a linear function of the phase-angle of such a voltage, and, therefore, of the position of the movable part of the synchronous transformer by means of which this voltage is obtained, can be obtained by differentiating this voltage after it has been limited. Other networks, to be connected to the poly-phase winding of a synchronous transformer, the single phase winding of which is fed by an alternating voltage, have been developed that supply pairs of pulses. The moment of occurrence of these pulses change in the opposite direction as a linear function of the position of the movable part of the synchronous transformer so that the pulses out of such a pair define a time interval the duration of which is a linear function of the position of the movable part of the synchronous transformer and, therefore, of the value to be established. Other systems with synchronous transformers can supply only one of the two pulses that limit the time interval and in these systems the second limit of the time interval is provided by a recurrent phenomenon, such as a recurrent pulse, with a fixed moment of occurrence. Pulses of this type can be supplied by means of a circuit cooperating with a synchronous transformer with a fixed adjustment.

The values supplied by an arrangement of this type described above are, however, of a restricted accuracy. Particularly, the values supplied by the coarse-reading system are not completely adapted to those supplied by the fine reading system. Errors may be caused by inequality in the circular pitch and in the pitch-circle of the gears coupling the coarse and the fine transmittter, deviations resulting from the slots of stator and rotor of the synchronous transformers, and the discontinuity resulting from the finite duration of the counting pulses supplied to the counters. Such errors are especially unacceptable in the vicinity of the zero-passage of the transmitter of the fine system, where they may give rise to a total error corresponding to the value represented by a complete revolution of the fine transmitter. In order to avoid these errors an arrangement has been proposed (in the U.S. Pat. 3,440,410 of the applicant) in which the fine and the coarse transmitter comprise at least one overlapping position, the coarse counter is not reset to zero before a digitalising operation is started but to a quiescent position situated a number of units before the zero-setting, while, if afer a digitalising operation has been effected, the settings of the overlapping part of the fine and coarse counter are not equal, an adaptation of the setting of the coarse counter to that of the fine counter is effected by causing at least the non-overlapping part of the coarse counter to step forward. In certain embodiments of this type the adaptation is effected by causing the complete coarse counter, including the overlapping part, to step forward until this overlapping part registers the same value as the overlapping part of the fine counter. In other embodiments of this type the setting of the overlapping part of the coarse counter remains unchanged whereas only the non-overlapping part receives a pulse if comparison of the settings of the overlapping parts of both counters show that a complete adaptation of the setting of the coarse counter to that of the fine couner would include a carry of a unit to the non-overlapping part of the coarse counter.

In a number of arangements of the type described above a digitalising operation is initiated by a measuring order, while the counting is started by a predetermined one of the two phenomena limiting the measuring interval. This will give rise to time-losses if a measuring order is received shortly after the phenomenon that is to start the counting has occurred. In the most unfavourable case the start of the counting may be delayed for about a complete cycle of the arrangement. In order to reduce such time-losses the applicant has developed an arrangement described in the U.S. Pat. No. 3,343,095 in which the counter starts counting after the reception of the first phenomenon following on the measuring order, the value stored by the counter after the counting operation being read unchanged if a predetermined one of the two phenomena (e.g. the first one of the two limiting the same interval) has started the counting, while its complement is read-out if the counting was started by the other phenomenon. Complementary reading may be effected by setting the counter complementarily before reading it.

The various methods of operation described above cannot be applied in the same arrangement without taking certain precautions. In an arrangement in which a correction of the position of the coarse counter is effected in order to adapt this position to the setting of the fine counter, the coarse counter is reset to a negative value —$n$ in order that the setting reached by this counter will be too low, so that the adapting correction can always be effected by causing said counter to step forward, so that no complicated counter, able to step in either direction will be required. If the counting in the coarse counter is started by the first phenomenon limiting the measuring interval, then said advantage is indeed obtained, for, as a result of the negative quiescent position, the setting of the counter will then never be too high. If, however, the coarse counter is started, by the phenomenon that marks the end of a measuring interval, the length of which corresponds to the value to be digitalized, then the coarse counter does not supply the value itself but its complement decreased by the shift $n$ of the zero position. If the complement of this complementary value is established, the value obtained is no longer too low but $n$ units too high. Then, because of the shift of the zero setting, it would always be necessary for the coarse counter to step backward during the correction. It is the object of the present invention to avoid under all circumstances the necessity for the coarse counter to step backward during the correction that is to adapt its setting to that of the fine counter. For this purpose the arrangement according to the invention is built in such a way that both coarse and fine counter comprise at least one overlapping position. The coarse counter is reset before counting to a quiescent position which, in the cycle of the counter, is situated $n$ units before the zero position after the counting operations have been completed. A comparison arrangement effects a comparison of the setting of the overlapping parts of both counters and, in the case of inequality, controls a correction of the setting of the coarse counter, adapting this setting to that of the fine counter by causing at any rate the non-overlapping part of the coarse counter to step forward under the control of stepping pulses. Furthermore, the counting operation in the coarse counter as well as the counting operation in the fine counter is started by the first phenomenon, limiting a measuring interval and destined to control the relative counter that follows on a measuring order. A complementary setting or reading of the fine counter is effected when the counting operation in said counter is started by the phenomenon marking the end of the measuring interval, while, if the counting in the coarse counter is started by the phenomenon marking the end of a measuring interval, the coarse counter is set in accordance with the complement of the setting reached by the counter during the counting operation increased by $2 \times n$ (the shift of the quiescent position). The latter two operations should they be required, take place before the comparison that initiates the correction of the setting of the coarse counter.

In order to elucidate the above it may be noted that the coarse counter stores the value, the complement of which corresponds to the setting it would have reached during a forward counting operation, after twice the shift of the quiescent value with respect to zero has been added to the setting reached during a counting operation started by the phenomenon marking the end of a measuring interval, provided that both types of counting operations start from the same shifted quiescent position.

In practice a complementary setting of a binary counter is as a rule effected by switching over all the trigger circuits in the counter and then supplying a pulse to the counter that causes a unit to be added to the value represented by the setting reached after the switch over of the trigger circuits. The addition of a unit is necessary because the switch over to the trigger circuits does not result in a setting representing the complement of the original setting but a value which is one unit lower. In other number systems corresponding measures must be taken. If all the various switching operations described above were effected successively and separately, first $2n$ would have to be added to the value stored by the coarse counter after it has finished its counting operation, then all trigger circuits would have to be switched over, and finally a unit would have to be added to the value now stored in the counter. The last operation can be dispensed with if instead of $2n$ the value $2n-1$ is added to the value stored in the counter after the counting operation.

A further simplification of the switching operations to be effected in the circuit arrangements cooperating with the coarse counter after a counting operation started by the phenomenon marking the end of a measuring interval can be obtained if the operations are effected in the following way:

(1) The trigger circuit in the coarse counter storing the lowest bit is left in the position reached;
(2) All other trigger circuits in the overlapping part are either switched over or left in their position reached, and a carry of a unit to the non-overlapping part of the coarse counter is either effected or not effected, depending on the setting(s) of the trigger circuit(s) storing the lower bit(s) in the coarse counter;
(3) All trigger circuits in the non-overlapping part of the coarse counter are switched over.

Character and sequence of the operations required in each special case can be established by investigating all possible permutations of settings of the trigger circuits in the coarse counter. Such an investigation shows which combinations of settings of the trigger circuits require the switch over of certain trigger circuits and for the carry of a unit to the non-overlapping part. In the specification various examples of this type are described, while certain of these embodiments constitute the subject matter of certain sub-claims.

The invention will now be elucidated by describing embodiments with reference to the annexed drawings.

The FIGS. 1, 2 and 3 together show a circuit of an arrangement according to the invention.

In these figures the first figure of a reference number is always equal to the number of the figure in which the part indicated by this reference number is situated, so that the number of the figures need not be mentioned.

Figure 1:
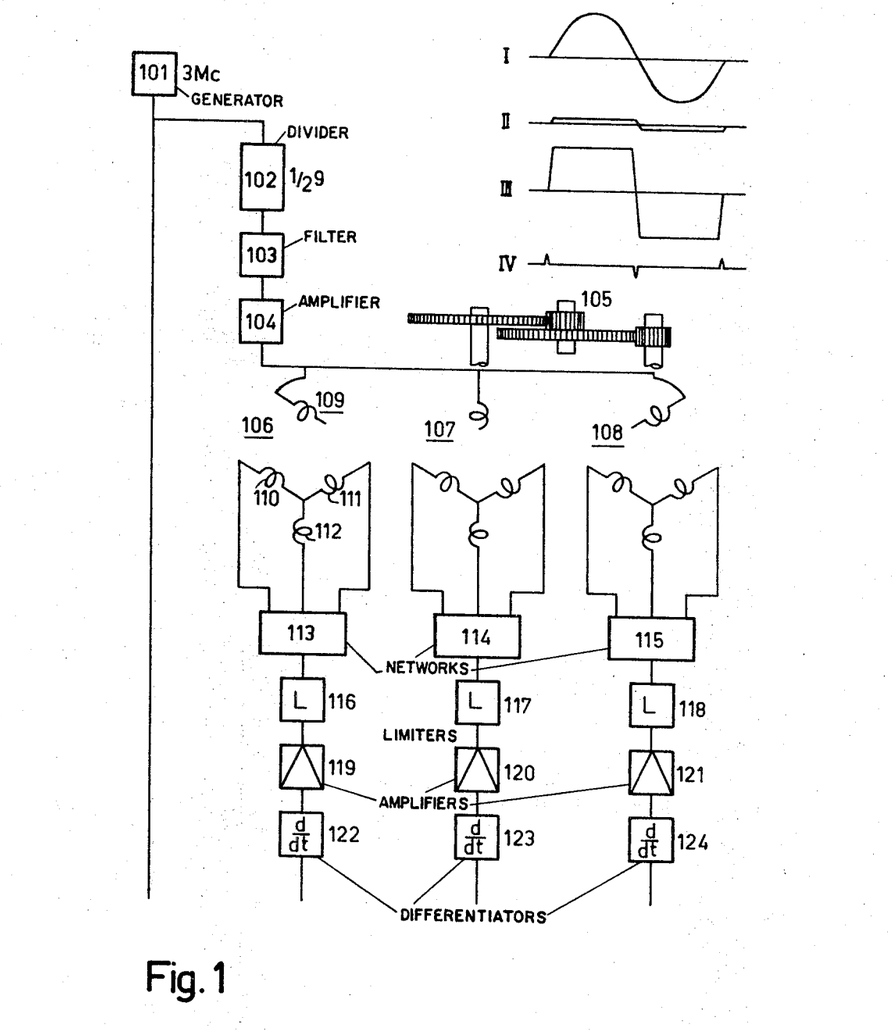
Figure 2:
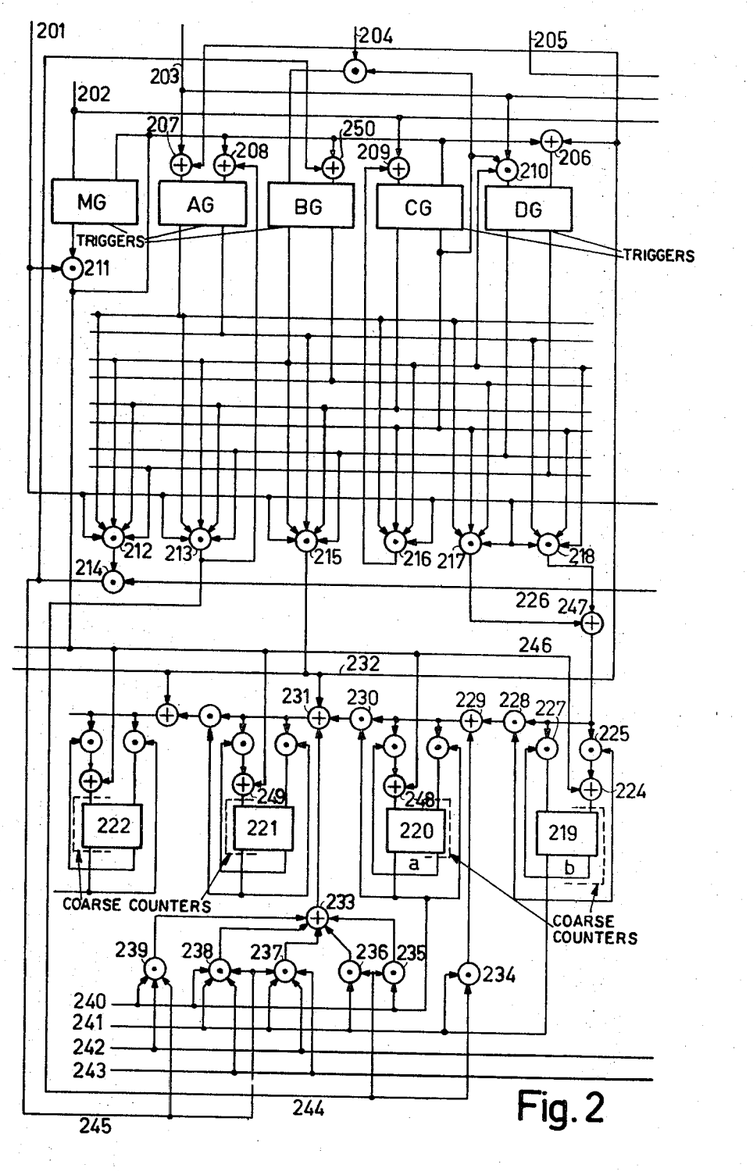
Figure 3:
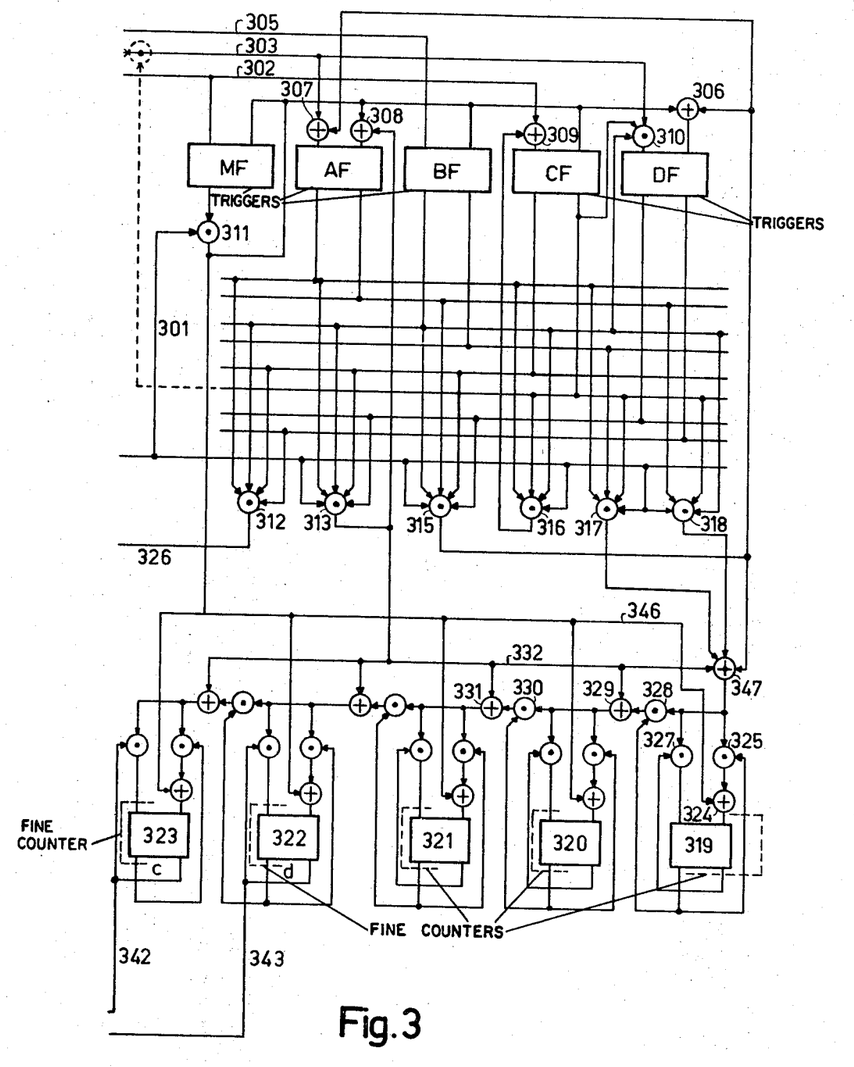

The complete circuit of the arrangement is obtained if FIG. 2 is placed under FIG. 1 and FIG. 3 is placed to the right of FIG. 2. In this embodiment the electrical phenomena that constitute the limits of a measuring interval are short pulses that are generated with the aid of three synchronous transformers. Two of these synchonous transformers are coupled to an object the position of which must be digitally established; the third synchronous of producing a fixed adjustment for the purpose of producing a fixed reference phenomenon. The supply voltage of the synchronous transformers is a single phase alternating voltage, derived by means of a frequency divider 102 from the output voltage of a crystal controlled generator 101 with a frequency of 3 mc. The frequency divider is a binary counter which can count up to $2^9$ and the last trigger circuit of which supplies the output voltage. Consequently it divides by $2^9$ and supplies a square-wave voltage with a frequency of $3/2^9$ mc. This square-wave voltage passes a low-pass filter 103, through which only the fundamental frequency of the square-wave voltage can pass. In this way a sine-shaped voltage is obtained that is amplified in the amplifier 104, the output voltage of which feeds the single phase rotor windings of the three synchronous transformers 106, 107 and 108. Synchronous transformer 106 with the single phase rotor winding 109 and the three-phase stator winding 110, 111, 112 partakes in the generation of the reference pulse occurring at a fixed moment in the cycle of the operation of the arrangement. This pulse constitutes one of the limits of the measuring interval of the coarse-reading system as well as of the fine-reading system. The synchronous transformer 107 belongs to the coarse-reading system, and it is connected by means of a gear train 105 to the shaft of the synchronous transformer 108 of the fine-reading system. The three-phase stator winding of each of these synchronous transformers supplies three voltages with the same phase angle, the amplitudes of which are determined by the relative angular positions of rotor and stator. Each of the three-phase stator windings is connected to a special network 113, 114 and 115 that transforms the three voltages supplied to it by the stator winding into an alternating voltage with a constant amplitude at a phase-angle that is a linear function of the relative angular position of rotor and stator of the synchronous transformer. Networks of this type are well-known in the art. It is presumed that the network that is the subject matter of the U.S. Pat. No. 3,401,330 of the applicant is applied for this purpose in the arrangement now described. The output voltage of such a network can be represented by the sine-shaped curve I (FIG. 1). Each of the three voltages supplied by the networks connected to the three synchronous transformers passes a limiter circuit 116, 117, 118, which then supply a voltage that can be represented by the curve II (FIG. 1). These three limiter output voltages are amplified in amplifiers 119, 120, 121, so that the steepness of the edges of the voltage curves is increased, and a voltage is obtained, that can be represented by the curve III (FIG. 1). The output voltages of these amplifiers are differentiated in the differentiating circuit 122, 123, 124. Because of the steepness of the edges of the voltages supplied to these differentiating circuits, these circuits supply well-defined strong pulses that can be represented by the curve in FIG. 1. It is presumed that the circuits that are controlled by these pulses can only react to positive pulses. Consequently they will only react to the pulses representing one of the two zero passages of the voltages supplied by the networks 113, 114 and 115. The counting operation in the fine counter will now be described. In the fine- as well as in the coarse-reading system the counting operation is initiated by a control pulse supplied by way of the conductor 202 (FIG. 2). In the fine-counting circuit arrangement shown in FIG. 3 this control pulse sets the trigger circuit MF, and it also sets, by way of the "or" circuit 309, the trigger circuit CF, should this trigger circuit not be in the set state at this moment. The next pulse supplied by the generator 101 can then flow by way of the conductors 201 and 301 and the "and" circuit 311 that is made conductive by the trigger circuit MF in its set state, and reach the trigger circuits MF, AF, BF, CF and DF and reset them in so far as they are not in the reset state at this moment. Furthermore, by way of conductor 346, it resets all counter trigger circuits of the fine counter, in so far as these trigger circuits are not in the reset state. The figure shows six of these counter trigger circuits 319–323, but it is obvious that an arbitrary number of counter trigger circuits might be inserted, for instance between the trigger circuits 321 and 322. These switching operations being completed, the circuit waits for the first pulse to be supplied by the circuit arrangement connected to either the synchronous transformer 106 or the synchronous transformer 108. Be it presumed that the first pulse reaching the circuit of the fine counter is supplied by the circuit arrangement belonging to the synchronous transformer 106. This pulse reaches by way of the circuits 203 and 303 and the "or" circuit 307 the left hand control input circuit of the trigger circuit AF, which it sets. The trigger circuit BF, is, at this moment, still in the reset state, so that the "and" circuit 310 cannot let this pulse pass to the left hand input circuit of the trigger circuit DF, which consequently remains in its reset state. The trigger circuit AF now being in the set state, and the trigger circuit BF and CF being in the reset state, pulses, supplied by the generator 101 and received by way of the conductor 201, can flow by way of the "and" circuit 317 and the "or" circuit 347 to the counting pulse input circuit of the fine counter with the trigger circuits 319–323. The fine counter is a pulse counter of a normal type and, for this reason, need only be superficially described. If the trigger circuit 319 is reset then, by way of the "and" circuit 327 which is made conductive by the voltage received from the right-hand output circuit of the trigger circuit in its reset state, a counting pulse can reach the left-hand input control circuit of the trigger circuit 319 and set it. If the trigger circuit 319 is set at the moment at which the counting pulse is supplied, then by way of the "and" circuit 325 that is made conductive by the voltage supplied by the left-hand output circuit of the trigger circuit in its set state, and the "or" circuit 324 this counting pulse can reach the right-hand control circuit of the trigger circuit and reset it. It appears that the trigger circuit reacts to each counting pulse received by it by switching over to its other state. Because of the short duration of the pulses in comparison to the time the trigger circuit needs for reacting, the pulse has already come to an end before the trigger circuit has been switched over, so that the same pulse can switch over the trigger circuit only once. When the trigger circuit 319 is in its set state it supplies such a voltage to the "and" circuit 328, that this "and" circuit can let a counting pulse received by the trigger circuit pass to the next trigger circuit 320 by way of the "or" circuit 329. This trigger circuit reacts in the same way as trigger circuit 319 to the pulses received in this way. Because only half of the pulses are permitted to reach the next trigger circuit, each trigger circuit is switched over only half as many times as the previous trigger circuit in the counter. Consequently the counter counts the pulses in a binary system. While the counter is counting pulses in this way, at the moment determined by the angular adjustment of the synchronous transformer 108, a pulse is received by way of conductor 305 from the circuit arrangement connected to said synchronous transformer. This pulse sets the trigger circuit BF, so that no further counting pulses can pass the "and" circuit 317. Because at this moment the trigger circuit AF and BF are in the set state, and the trigger circuit CF is in the reset state, a pulse obtained from the generator 101 can flow, by way of the "and" circuit 316 and the "or" circuit 309 to the left-hand control input circuit of the trigger circuit CF, that is consequently set. The setting of this trigger circuit CF definitely ends the supply of counting pulses to the counter. Because the first pulse received was a pulse, limiting the beginning of a measuring interval, the counting operation now described is effected in a forward direction, so that the value stored in the counter is indeed a representation of the angular position of the synchronous transformer 108. This value can be supplied as a measuring result without being subjected to further operations. As far as the fine counter is concerned, the correction of the setting of the coarse counter can now be initiated. The fact that the fine-counting operation has been completed is signalled to the circuit arrangement of the coarse-counter by way of the "and" circuit 312 that supplies a voltage differing from the quiescent voltage to the conductor 326 as soon as the trigger circuit AF, BF and CF are in the set state and the trigger circuit DF is in the reset state.

The first pulse limiting a measuring interval received by the circuit of the fine counter might also have been the pulse supplied by the circuits belonging to the synchronous transformer 108, which pulse defines the end of a measuring interval. This pulse is received by way of conductor 305, and sets the trigger circuit BF. Because at this moment the trigger circuits AF and CF are in the reset state and the trigger circuit BF is in the set state, counting pulses can pass the "and" circuit 318 and flow to the counter and cause it to step. As soon as the the beginning of the next measuring interval is reached, a pulse is received by way of circuit 303 from the circuit arrangement belonging to the synchronous transformer 106, and this pulse sets the trigger circuit AF. Consequently counting pulses can no longer reach the counter by way of the "and" circuit 318. At the moment at which this second pulse, defining a measuring interval, is received by way of conductor 303, the trigger circuit BF is in the set state and the trigger circuit CF is in the reset state. Consequently by way of "and" circuit 310, said pulse can reach the left hand control circuit of the trigger circuit DF, and set this trigger circuit. The fact that the trigger circuit DF is in the set state shows that instead of the value itself its complement has been established. Now the trigger circuits AF and BF are in the set state and the trigger circuit CF is in its reset state, so that a counting pulse can flow by way of "and" circuit 316 and "or" circuit 309 to the left hand input control circuit of trigger circuit CF and set it. In the case now described, the correct value, corresponding to the value that would have been obtained in a forward counting operation, is obtained by first switching over all trigger circuits in the counter and then supplying a counting pulse to the counter. At this moment the trigger circuits AF, BF, CF and DF are all in the set state and consequently the next counting pulse can flow by way of "and" circuit 313. This pulse controls the switch-over of all counter trigger circuits. For this purpose, in each of these counter trigger circuits, it flows by way of an "or" circuit in the counting pulse supply circuit ("or" circuits 329 and 331 in the case of trigger circuits 320 and 321). It has been described above how such a pulse switches the trigger circuit over to the condition in which it was not at the moment the pulse was received. The pulse that flows by way of the "and" circuit 313 also reaches, by way of "or" circuit 308, the right hand control input circuit of the trigger circuit AF, so that this trigger circuit is reset, which makes the "and" circuit 313 non-conductive for counting pulses, so that the counter trigger circuit receive only one pulse, and consequently are only switched over once. Now the trigger circuits BF, CF and DF are in the set state, and the trigger circuit AF is in the reset state, so that the next counting pulse can flow by way of "and" circuit 315 and "or" circuit 347 to the counting pulse input circuit of the counter, in this way causing the counter to add one unit to the value stored by it. The counter has now reached the setting it would have reached during a counting operation effected in the forward direction. Moreover, the pulse, that flows by way of the "and" circuit 315, reaches, by way of the "or" circuit 306, the right hand control input circuit of the trigger circuit DF, which it resets and, by way of the "or" cirsuit 307 the left hand control input circuit of the trigger circuit AF, which it sets. The circuit arrangement of the fine counter has now reached the state which it would have reached during a counting operation in a forward direction, in which state the trigger circuits AF, BF and CF are in the set condition and the trigger circuit DF is in the reset condition, a combination of conditions which shows that the counting operation of the fine counter has been completed. This state is signalled by way of the "and" circuit 312 to the circuits of the coarse counter in the way already described above.

The operation of the circuit of the coarse counter will now be described. Coarse and fine counter comprise two overlapping binary positions, and the comparison of the settings reached by these positions permits the control of the correction of the setting of the coarse counter which adapts this setting of the setting of the fine counter. During this correction operation at least the non-overlapping part of the coarse counter receives counting pulses. Preferably the counter is arranged in such a way that the coarse counter need never step backwards during the correction, because a counter capable of stepping backwards is complicated and expensive.

Should the coarse counter be reset to its zero position before effecting a counting operation it would be possible for the value stored by the coarse counter to be too high in comparison to the setting of the fine counter. It would then be necessary for the coarse counter to step backward during the correction. For this reason the coarse counter is not reset to zero, but to a value which, in the cycle of the part of the coarse counter overlapping the fine counter is situated a few units, two units in this case, before the zero position. When the coarse counter is reset to its quiescent state, all trigger circuits, with the exception of the trigger circuit storing the lowest bit, must be set, while the trigger circuit storing the lowest bit must be reset. For this reason the pulse which resets the coarse counter to its quiescent state reaches, by way of the "or" circuit 224, the right-hand control input circuit of the trigger circuit 219 which stores the lowest bit in the coarse counter, and it reaches the left-hand control input circuit of all other counter trigger circuits by way of "or" circuits in these left-hand control input circuit of all other counter trigger circuits such as the "or" circuits 249 and 248 in the input circuits of the trigger circuits 221 and 220. Consequently the trigger circuit storing the lowest bit is reset, while all other counter trigger circuits are set. The same control pulse, received by way of conductor 202, which starts the counting operation of the fine counter, also starts the counting operation of the coarse counter. In the circuits belonging to the coarse counter, this control pulse sets the trigger circuit MG and, should this trigger circuit not be in its reset state, sets the trigger circuit CG by way of "or" circuit 209. In its set state the trigger circuit MG permits the "and" circuit 211 to let the next pulse received by way of conductor 201 from generator 101 pass, in order to set the trigger circuits MG and CG directly, the trigger circuit BG by way of "or" circuit 250, the trigger circuit AG by way of "or" circuit 208 and the trigger circuit DG by way of "or" circuit 206, in so far as these trigger circuits were not in their reset state at the moment said pulse was received. The same pulse reaches the various coarse counter trigger circuits by way of conductor 246, in order to reset the counter to its quiescent state. The state of the circuit now reached its characteristic for the fact that the counter is ready to start its counting operation. It now waits for one of the pulses supplied by the circuits connected either to the synchronous transformer 106 or to the synchronous transformer 107. Be it presumed that the first pulse limiting a measuring interval is supplied by the circuit connected to the synchronous transformer 106 and that it reaches the circuit of the coarse-counter by way of the conductor 203. This pulse sets the trigger circuit AG, the left hand input control circuit of which it reaches by way of the "or" circuit 207. The pulse cannot reach the left-hand control circuit of the trigger circuit DG because at this moment the trigger circuit BG is still in its reset state, so that its output voltage makes the "and" circuit 210 non-conductive.

The trigger circuit AG now being in its set state and the trigger circuits BG and CG in their reset states, counting pulses received by way of conductor 201 can reach the counting pulse input circuit of the coarse counter by way of the "and" circuit 217 and the "or" circuit 247. This counter operates in the same way as the fine-counter. At the end of the measuring interval a pulse supplied by the circuit arrangments connected to the synchronous transformer 107 is received by way of conductor 204. This pulse sets the trigger circuit BG, so that no further counting pulses can reach the coarse counter by way of the "and" circuit 217. The trigger circuits AG and BG now being in their set state and the trigger circuit CG in its reset state, the next counting pulse can flow by way of "and" circuit 216 and "or" circuit 209 to the left hand control input circuit of trigger circuit CG and set it. This makes "and" circuit 216 non-conductive for the pulses. The state now reached, in which the trigger circuits AG, BG and CG are in the set state, while the trigger circuit DG is in its reset state shows that the counter has completed a counting operation in a forward direction. Counting pulses can now reach "and" circuit 214 by way of "and" circuit 212, which shows that the correction of the setting of the coarse counter may be initiated. When, at this moment, the fine counter has completed its counting operation and, in the way described above, supplies by way of "and" circuit 312, a voltage differing from the quiescent voltage to the conductors 326, 226, counting pulses can flow by way of the "and" circuits 212 and 214 in order to control the correction of the setting of the coarse-counter.

In the arrangement described, the setting of the part of the coarse counter overlapping the fine counter is not used for supplying a part of the measured value. The part of the value that is to be stored by this overlapping part of the coarse counter is obtained from the overlapping part of the fine counter, which stores the same value. The only important question in the matter of correcting the position of the coarse counter is whether a carry to the part of the coarse counter that does not overlap a fine counter would have to be effected if the setting of the overlapping part of the coarse counter is actually adapted to the setting of the corresponding part of the fine counter. It should be noted that the range of the overlapping parts of the counters must be adapted to the largest possible error in such a way that all possible incorrcet settings of this part of the coarse counter will be situated within a complete cycle of this part. Only then, by comparing the settings of the overlapping parts of coarse and fine counter can it be established, which setting of the coarse counter would be the correct one. Furthermore the difference between the zero setting and the quiescent setting of the coarse counter must be at least as large as the largest possible error, so that, after the counting operation in the coarse counter has been completed, the value stored by this counter is either lower than or equal to the correct setting, and the coarse counter need only step in a forward direction when effecting the correction. All these things should be taken into account when establishing the number of overlapping positions of the counter. It must now be established for which combinations of settings of the overlapping parts of the counters a carry of a unit to the non-overlapping part of the coarse counter will be necessary. A carry is necessary should the setting of the overlapping part of the course counter pass the value 00 if its setting were adapted to that of the corresponding part of the fine counter by causing the coarse counter to step forward. If the overlapping part of the fine counter stores 00, then a carry is necessary if the overlapping part of the coarse-counter stores 01, 10 or 11. Should the over-lapping part of the fine counter store the value 01 then a carry is necessary if the overlapping part of the coarse counter stores 10 or 11. If the overlapping part of the fine counter stores 10, then a carry is only required if the overlapping part of the coarse counter stores 11, while no carry is required if the fine counter stores 11. The following table shows a summary of these facts.

| Setting of the fine counter | Setting of the coarse counter that requires a carry | | |
|---|---|---|---|
| 00 | 01 | 10 | 11 |
| 01 | 10 | 11 | |
| 10 | 11 | | |
| 11 | | | |

In the above it is presumed that the coarse counter preferably shows a positive error with respect to the correct value diminished by the shift of the quiescent position. If, however, a negative error is more likely to occur, then the required carry operations can be derived from the table following now.

| Setting of the fine counter | Setting of the coarse counter that requires a carry | | | |
|---|---|---|---|---|
| 00 | 11 | 10 | 01 | 00 |
| 01 | 11 | 10 | 01 | |
| 10 | 11 | 10 | | |
| 11 | 11 | | | |

The first of the two above tables can be represented by the following Boolean formula:

$$\text{carry} = a \cdot \bar{c} + b \cdot \bar{c} \cdot \bar{d} + a \cdot b \cdot \bar{d}$$

in which $a$ and $b$ are the lowest bit but one and the lowest bit stored in the overlapping part of the coarse-counter, while $c$ and $d$ are the highest bit and the highest bit but one stored in the overlapping part of the fine counter. Three "and" circuits 237, 238 and 239 each of them representing a term in the formula, and an "or" circuit 233 for the purpose of combining the output circuits of these "and" circuits, are able to control the carry operation according to the first table. One input circuit of each of these "and" circuits receives a pulse when the correction of the setting of the coarse counter must be effected, but this pulse will only be able to pass such an "and" circuit if other input circuits of the "and" circuits receive voltages which permit this passage. For this reason each of these "and" circuits has an input circuit corresponding to each factor in the term which it represents and which receives the bit voltage corresponding to said factor from an output circuit of the trigger circuit storing the relative bit. In this way the "and" circuit 239 receives, by way of circuit 240, a voltage differing from the quiescent value if the trigger circuit 220 is in its set condition, while it receives by way of conductor 242, a voltage differing from the quiescent voltage if the trigger circuit 323 is in its reset condition. This corresponds to the term $a \cdot \bar{c}$. If the said trigger circuits are in the said conditions the "and" circuit 239 permits the pulse, received by way of the "and" circuits 212 and 214 after the coarse as well as the fine counter have finished their setting operations, to pass by way of the "or" circuit 233 and the "or" circuit 231 to the non-overlapping part of the coarse counter, in order to cause this part to effect one step. In a similar way the "and" circuit 238 receives voltages differing from the quiescent voltages by way of the conductors 240, 241 and 243, if the trigger circuits 220 and 219 are in the set condition, while the trigger circuit 322 is in the reset condition. This "and" circuit consequently realises the term $a \cdot b \cdot \bar{d}$ while "or" circuit 237 realises in a similar way the term $b \cdot c \cdot \bar{d}$.

The number of pulses supplied to the non-overlapping part of the coarse counter in this way, should obviouly be restricted to one. In order to effect this restriction the pulse flowing by way of the "and" circuit 214 also reaches by way of the "or" circuit 250 the right hand control circuit of the trigger circuit BG, which it resets, so that no further pulse can pass the "and" circuit 212.

It is also possible that the first pulse limiting a measuring interval, received after the reception of the control pulse by way of the conductor 202, is the pulse supplied by the circuit connected to the synchronous transformer 107, which is a pulse marking the end of a measuring interval. This pulse then sets the trigger circuit BG, so that, by way of "and" circuit 218 counting pulses are supplied to the coarse counter, which consequently starts counting. At the beginning of the next measuring interval a pulse is received by way of conductor 203 from the circuits connected to the synchronous transformer 106. This pulse reaches by way of the "or" circuit 207 the left hand control circuit of trigger circuit AG, which it sets, and by way of "and" circuit 210, which is now conductive because the trigger circuit BG is in its set state, reaches the left hand control input circuit of the trigger circuit DG, which it also sets. The coarse counter then receives no further counting pulses because the "and" circuit 218 has become non-conductive. The trigger circuits AG and BG now being in the set condition, and the trigger circuit CG in the reset condition, the "and" circuit 216 can let a pulse pass by way of "or" circuit 209 to the left-hand control input circuit of the trigger circuits CG, which it sets. The state now reached, in which all the trigger circuits AG, BG, CG and DG are in the set condition, is characteristic for the fact that a counting operation which supplies the complement of the value to be established has been completed. It is, however, not possible for the coarse-counter to be set to the value which this counter would have stored after effecting a counting operation in a forward direction, to the value which is the complement of the value it stores, for the coarse-counter starts counting from the quiescent position —2. Therefore, the value reached during the counting operation will, generally, be too low, which is necessary in order to permit the correction to be effected by stepping forward. If, in the way described in connection with the fine-counter, the coarse counter is set to the value which is the complement of the value reached during the counting operation, then the value stored in the coarse counter after this complementary setting has been effected would be as many units too high as the value stored after the counting operation was too low. Consequently, as a result of the negative shift of the quiescent value, the correction for the purpose of adapting the setting of the coarse counter to that of the fine counter, would require the counter to step backward. In order to permit a correction by stepping in a forward direction it is desirable for the coarse counter to store the value it would have stored after a counting operation in a forward direction, for which reason the value stored by the coarse counter after a complementary counting operation is subjected to certain transformations. This value will be stored by the coarse counter if, after a counting operation effected during the interval situated between two measuring intervals twice the shift of the quiescent position with respect to zero is added to the value stored by the counter before it is set according to the complement of the stored value. In the arrangement described the quiescent position is situated two units before the zero position; the shift of the quiescent position is consequently 2, so that, before the coarse counter is set, in accordance with the complement of the value stored by it four units must be added to the value stored in the coarse counter after a counting operation effected during an interval situated between two successive measuring intervals. In practice a complementary setting of a binary counter is effected by switching over all trigger circuits in the counter and then adding a unit to the value stored by this counter. The last operation can be dispensed with if the value added to the value stored in the counter before switching over the trigger circuit is diminished by 1 unit.

The setting of the counter to this value can be simplified still further. For each combination of the lowest binary bits of the setting of the coarse counter it can be established which combination of bits will be obtained after effecting the switching operations described above. The relative trigger circuits can then simply be controlled so as to obtain the required conditions. This operation having been effected the trigger circuits belonging to the non-overlapping positions can be switched over, with this exception, that in case of certain combinations of the lowest bits it will be necessary to add a unit to the value stored in the non-overlapping part of the coarse counter before the trigger circuits in this part of the counter are switched over. The following table permits the reader to understand the required operations.

| I | II | III |
|---|---|---|
| 000 | 011 | 100 |
| 001 | 100 | 011 |
| 010 | 101 | 010 |
| 011 | 110 | 001 |
| 100 | 111 | 000 |
| 101 | 000 | 111 |
| 110 | 001 | 110 |
| 111 | 010 | 101 |

Column I comprises all possible settings of the trigger circuits for the lowest three bits in the coarse counter directly after a counting operation in a backward direction has been effected. Column II shows the setting of these trigger circuits after three units have been added to the value stored by these trigger circuits, while column III shows the settings of these trigger circuits when they have been switched over after the said addition. The said trigger circuits would have reached the same settings after a counting operation effected in a forward direction. In order to realize these settings the following switching operations are effected:

The trigger circuit in the coarse-counter that stores the lowest bit remains in the condition reached during the counting operation, because this bit will be unchanged after all the required switching operations have been effected. The trigger circuit that stores the lowest bit but one is switched over if the trigger circuit that stores the lowest bit stores the value 1, while it remains in the condition reached when the trigger circuit storing the lowest bit stores the value 0. Finally a pulse is supplied to the non-overlapping part of the coarse counter before the trigger circuits in this part are switched over if at least one of the two trigger circuits which store the lowest two bits stores the value 1. After these switching operations have been effected all trigger circuits in the non-overlapping part of the coarse counter are switched over. All these switching operations must be effected before the correction adapting the setting of a coarse counter to that of the fine counter are effected. They are initiated as soon as the state in which the trigger circuits AG, BG, CG and DG are all in the set condition, is reached. A counting pulse can then flow by way of "and" circuit 213 to conductor 244. This pulse resets trigger circuit AG, so that only one pulse can flow through said "and" circuit. If the trigger circuit 219, which stores the lowest bit in the coarse counter, is in its set condition, and consequently stores the value 1, then the pulse supplied by way of conductor 244 can reach the trigger circuit 220 by way of the "and" circuit 234 and the "or" circuit 229, switching this trigger circuit over. Furthermore said pulse can reach the non-overlapping part of the coarse counter by way of "and" circuit 236 and "or" circuits 233 and 231 if the trigger circuit 219 is in the set condition, and by way of "and" circuit 235 and the "or" circuits 233 and 231 if trigger circuit 220 is in the set condition, causing this part of the coarse counter to take one step forwards. The fact that simultaneously with this operation a trigger circuit, such as 219 or 220, that partakes in the control of the operation, may be switched over by the same pulse does not prevent the non-overlapping part of the coarse counter from receiving said pulse and reacting to it, because said pulse has already reached the non-overlapping part of the counter and initiated the step to be taken by this counter before the trigger circuits 219 and 220 have reacted to the same pulse and have changed their condition, for the time it takes a trigger circuit, the switch-over of which has been initiated by a pulse, to actually switch-over, is long as compared with the duration of the pulse. The next counting pulse flows through the "and" circuit 215, which is now conductive for said pulse because the trigger circuits BG, CG and DG are in their set condition and trigger circuit AG is in its reset state. This pulse flows to the conductor 232. By way of "or" circuit 206 it reaches the right hand control circuit of trigger circuit DG and resets it; by way of "or" circuit 207 it reaches the left-hand control circuit of trigger circuit AG and sets it, and by way of "or" circuit allotted to the trigger circuits in the non-overlapping part of the coarse counter (for instance "or" circuit 231 allotted to trigger circuit 122) it reaches all the trigger circuits in this non-overlapping part and switches them over. The resetting of the trigger circuit AG prevents a second pulse from being supplied to the trigger circuits in the non-overlapping part of the coarse counter, so that these trigger circuits are switched over only once. The fact that the trigger circuit DG has been reset shows that all switching operations necessary in connection with the fact that the counting operation was effected during an interval between two successive measuring intervals, have been completed. The coarse counter now stores the value it would also have stored if the counting operation had been effected in a forward direction during a measuring interval. Furthermore the trigger circuits AG, BG and CG are in the set state and trigger circuit DG is in the reset state, so that the same condition has been reached that also results after a counting operation in a forward direction has been completed. The correction of the setting of the coarse counter can now be initiated and effected in the way already described above. The arrangement can be built with more than two (for instance three) overlapping positions of the counters and with various shifts of the quiescent setting of the coarse counter. The following table relates to an arrangement with three overlapping positions and a quiescent setting that is situated 4 units before zero, and shows which transformations are to be effected after a counting operation performed during an interval situated between two successive measuring intervals.

| I | II | III |
|---|----|-----|
| 0000 | 0111 | 1000 |
| 0001 | 1000 | 0111 |
| 0010 | 1001 | 0110 |
| 0011 | 1010 | 0101 |
| 0100 | 1011 | 0100 |
| 0101 | 1100 | 0011 |
| 0110 | 1101 | 0010 |
| 0111 | 1110 | 0001 |
| 1000 | 1111 | 0000 |
| 1001 | 0000 | 1111 |
| 1010 | 0001 | 1110 |
| 1011 | 0010 | 1101 |
| 1100 | 0011 | 1101 |
| 1101 | 0100 | 1011 |
| 1110 | 0101 | 1010 |
| 1111 | 0110 | 1001 |

Column I shows all possible settings of the coarse counter after a counting operation performed during an interval situated between two successive measuring intervals.

Column II shows the settings of the coarse counter after twice the shift of the quiescent position diminished by one unit has been added to the value stored in the counter.

Column III shows the settings reached by the coarse counter when all the trigger circuits have been switched over after said addition has been effected.

These transformations can be effected by performing the following sequence of switching operations:

(1) the condition of the trigger circuit storing the lowest bit in the coarse counter remains unchanged;
(2) the trigger circuit for the lowest bit but one is switched over if the trigger circuit for the lowest bit stores the value 1;
(3) the trigger circuit of the lowest bit but two is switched over if at least one of the trigger circuits for the lowest two bits stores the value 1;
(4) a carry of a unit to the non-overlapping part of the coarse counter is effected if at least one of the trigger circuits storing the three lowest bits in the coarse counter stores the value 1;
(5) after all these switching operations have been effected all trigger circuits in the non-overlapping part of the coarse counter are switched over.

In the same way as in the arrangement with two overlapping positions all these switching operations but the last one can be effected simultaneously. These switching operations can be controlled by simple combinations of "and" and "or" circuits that need not be described in detail. The trigger circuits AG, BG, CG and DG can control these operations in the same way as in the arrangement with two overlapping positions. Each of the trigger circuits, the settings of which together determine whether a certain trigger circuit will have to be switched over, controls the voltage applied to an input circuit of an "and" circuit through which the pulse that effects the switch overflows.

The way in which in the various embodiments the correction of the setting of the coarse counter is effected is no part of the present invention. Various circuits for this purpose have been described in the U.S. Pat. 3,440,410 of the applicant of the present application. The following table shows in which cases a carry of a unit to the non-overlapping part of the coarse counter is to be effected for the purpose of this correction. It applies to an arrangement with three overlapping positions in which the coarse counter is reset to $-4$.

| setting of the overlapping part of the fine counter | setting of the overlapping part of the coarse-counter that has been reset to -4 | | | | | | | | | | | | | |
|---|---|---|---|---|---|---|---|---|---|---|---|---|---|---|
| | add 1000 | | | | | | | no addition | | | | | | |
| 000 | 111 | 110 | 101 | 100 | 011 | 010 | 001 C | | | | | | | 000 |
| 001 | 111 | 110 | 101 | 100 | 011 | 010 B | | | | | | | 001 | 000 |
| 010 | 111 | 110 | 101 | 100 | 011 D | | | | | | | 010 | 001 | 000 |
| 011 | 111 | 110 | 101 | 100 A | | | | | | | 011 | 010 | 001 | 000 |
| 100 | 111 | 110 | 101 F | | | | | | | 100 | 011 | 010 | 001 | 000 |
| 101 | 111 | 110 E | | | | | | | 101 | 100 | 011 | 010 | 001 | 000 |
| 110 | 111 G | | | | | | | 110 | 101 | 100 | 011 | 010 | 001 | 000 |
| 111 | | | | | | | | 111 | 110 | 101 | 100 | 011 | 010 | 001 | 000 |

The left column comprises all possible settings of the overlapping part of the counter of the fine system. The right-hand part of the table comprises all possible settings of the overlapping part of the coarse counter, the upper left triangular field in the right part comprise all settings of the non-overlapping part of the coarse counter which require the carry of a unit in the case of their simultaneous occurrence with the setting of the overlapping part of the fine counter present on the same line, while the lower right triangular field of the right part of the table comprise all settings of the coarse counter for which no such carry is required if they occur simultaneously with the fine counter setting present on the same line. It is easy to draft such a table. It is only necessary to consider each combination of settings and to establish whether a complete correction would require a carry or not. The combinations of settings that, according to this table, require the addition of a unit to the value stored in the non-overlapping part of the coarse counter can be established by a combination of seven "and" circuits with no more than four input circuits each and one "or" circuit with seven input circuits or an equivalent combination of "or" circuits. In the table the settings of the coarse counter that require a carry are arranged in groups, each group enclosed in a rectangle indicated by a capital letter present near its lower right hand vertex. The group A comprises all combinations in which the digit with the highest denomination stored in the overlapping part of the coarse counter is 1, and the digit with the highest denomination stored in the overlapping part of the fine counter is 0. The presence of a combination belonging to this group can, therefore, be established by an "and" circuit with two input circuits. Henceforth the three overlapping bits stored in the fine counter will be called $F_1$, $F_2$ and $F_3$, $F_1$ being the bit with the highest denomination, while the overlapping bits stored in the coarse counter are called $G_1$, $G_2$ and $G_3$, $G_1$ being the bit with the highest denomination. The "and" circuit which establishes the presence of a combination belonging to the group A receives voltages corresponding to $\overline{F}_1$ and $G_1$. The group B is added to the group A by establishing whether a combination of settings is present in which the bits $F_1$ and $F_2$ are 0 and the bit $G_2$ is 1. The occurrence of this group can be established by means of an "and" circuit with three input circuits. It also establishes the presence of a few combinations belonging to the group A, but that is no objection. In such a case the voltage which initiates the carry is received from more than one "and" circuit, which does not prevent the correct operation. Careful consideration of this table shows the circuit arrangement that can be represented by the Boolean formula:

A     B     C     D     E     F     G
$\overline{F}_1 \cdot G_1 + \overline{F}_1 \cdot \overline{F}_2 \cdot G_2 + \overline{F}_1 \cdot \overline{F}_2 \cdot \overline{F}_3 \cdot G_3 + \overline{F}_1 \cdot \overline{F}_3 \cdot G_2 \cdot G_3 + \overline{F}_1 \cdot \overline{F}_2 \cdot G_1 \cdot G_2 + \overline{F}_2 \cdot \overline{F}_3 \cdot G_1 \cdot G_3 + \overline{F}_3 \cdot G_1 \cdot G_2 \cdot G_3$ will supply a voltage differing from the quiescent value in all cases in which a carry must be effected. The combination of seven "and" circuits and one "or" circuit represented by the above formula will have to replace the "and" circuits 237, 238 and 239.

The correction of the setting of the coarse counter can also be effected in one of the other ways described in the U.S. Pat. 3,440,410. It would be possible, for instance, to cause the complete coarse-counter, including its overlapping part to step forward until the overlapping part has reached the same setting as the overlapping part of the fine-counter. In such an arrangement the pulses supplied by way of the conductor 245 flow to the "or" circuit 247. Furthermore, a comparison circuit compares the position reached by the overlapping parts of the coarse and the fine counter, and in the case of equal settings supplies a voltage for the purpose of resetting trigger circuit BG in order to interrupt the correction operation. The left-hand input circuit of "or" circuit 250 is for this purpose connected to the output circuit of the comparison circuit instead of to the output circuit of "and" circuit 214. It is superfluous to describe an arrangement of this type in greater detail. As a rule is takes more time to effect the correction of the setting of the coarse counter than does an arrangement in which the correction is restricted to the non-overlapping part of the coarse counter.

In order to prevent a pulse, supplied to the circuit 204 by the circuit arrangements connected to the synchronous transformer 108 after a counting operation and the correction of the setting of the coarse counter have been effected, from once again setting the trigger circuit BG, which would lead to a wrong measuring result, an "and" circuit, that is controlled by the trigger circuit CG to prevent the passage of pulses as long as trigger circuit CG is in the set state, is inserted in the circuit 204.

During the short interval in which the counter, after having effected a counting operation in an interval between two successive measuring intervals, is adjusted to the complement of the value previously stored by it, the trigger circuits AG or AF will be in the reset state. Although this is not very probable, a pulse received from the circuits connected to the synchronous transformer 106 might set this trigger circuit before the various setting operations and the carry have been effected and this might prevent the completion of said operations as well as the switch over of the trigger circuits in the counter. In order to make sure that the trigger circuit AG or the trigger circuit AF cannot be set again in this way an extra "and" circuit, controlled by the trigger circuit CG (in the circuit of the coarse counter) or CF (in the circuit of the fine counter) in order to prevent the passage of pulses for as long as the controlling trigger circuit is in its set state, can be inserted in the control circuit through which the pulse supplied by the circuit connected to the synchronous transformer reaches the relative trigger circuit AG or AF. In FIG. 3 such an "and" circuit is shown in dotted lines.

The maximum counting capacity of the counter must be adapted in such a way to the highest value that can be established, that the counter reaches its highest setting when said highest value is digitalised, otherwise the correct value cannot be obtained by setting the counter to the complement of the value stored if a counting operation has been effected during an interval between two measuring intervals.

Another method for setting the fine counter to the complement of the value stored might be applied. A counter might, for instance, be applied, the quiescent position of which is −1, and in which, after a counting operation in a forward direction has been effected, a unit is added to the value stored, and all trigger circuits are switched over after a counting operation effected during an interval between two measuring intervals.

What I claim is:

1. In an arrangement for digitally establishing a value represented by two recurrent time intervals, each switch interval occurring between two electric signals, one of said time intervals representing coarse portion and the other the fine portion of said value, the combination comprising a source of counting pulses, a coarse and a fine digital electronic counter, a control circuit for said counters, said control circuit being provided with input circuits for receiving said two electric signals and for receiving a measuring order signal, said measuring order signal initiating the digitalizing operation, said control circuit including means for resetting said coarse and fine counter to their quiescent positions, said coarse counter quiescent position being situated $n$ units before the zero position, means responsive to a measuring order signal for switching said control circuit to a first state, said control circuit responsive in said first state to the first electric signal following said measuring order signal and limiting an interval representing the part of the value to be digitalized by the coarse counter for permitting the supply of pulses from the counting pulse source to be counted by the coarse counter and to the next electric signal limiting an interval representing the part of the value to be digitalized by the coarse counter for suppressing the supply of said pulses from the counting pulse source and to react to the first electric signal following on said measuring order and limiting an interval representing the part of the value to be digitalized by the fine counter for permitting the supply of pulses from the counting pulse source to be counted by the fine counter, and to the next electric signal limiting an interval representing the part of the value to be digitalized by the fine counter for suppressing the supply of these counting pulses and at least one overlapping position in the coarse and fine counters, a comparison circuit comparing the settings of said overlapping positions in the coarse and fine counters and supplying signals indicating the result of the comparison to said control circuit, said control circuit further including means responsive to the last of the electric signals which initiate during the same digitalizing operation the suppression of the supply of counting pulses to a counter for controlling the comparison circuit to effect a comparison and further responsive to a comparison output which indicates that the settings of the overlapping parts do not correspond for controlling a correction of the setting of the coarse counter by controlling the stepping forward at any rate of the non-overlapping part of the coarse counter, means in the control circuit arrangement responsive to suppression of the pulse supply to the fine counter by the signal marking the beginning of a measuring interval for providing a complementary setting or a complementary reading of the fine counter before said control circuit controls the comparison and means in said control circuit responsive to suppression of the pulse supply to the coarse counter by the signal marking the beginning of a measuring interval for controlling the setting of the coarse counter to the complement of a value that is $2 \times n$ (two times the shift of the quiescent position of the coarse counter) higher than the setting reached before the control circuit arrangement controls the comparison.

2. Arrangement according to claim 1, wherein the coarse counter is a binary counter including a chain of trigger circuits, the addition of $2n$ to the value stored and the setting of the counter to the complement of the value thus reached is obtained by means for adding $2n-1$ to the value stored after the completion of the counting operation and means for switching over the trigger circuits of the counter.

3. Arrangement according to claim 2, wherein the control circuit, in order to obtain the setting of the coarse counter that said counter would have obtained after the addition of $2n-1$ to the value stored after the completion of the counting and the switching over of the trigger circuits, includes means for leaving the trigger circuit in the coarse counter storing the lowest bit in the position reached, means controlling the switching of each remaining trigger circuit in the overlapping part of the coarse counter depending on the state of any trigger circuit storing the bit lower than that stored by such first mentioned trigger circuit in the overlapping part of the coarse counter, means controlling a carry of a unit to the non-overlapping part of the coarse counter, depending on the state of any trigger circuits in the overlapping part of the coarse counter and means for controlling, after the above switching operations have been effected, the switching over of all trigger circuits in the non-overlapping part of the coarse counter.

4. Arrangement according to claim 3, wherein the binary counters have two overlapping positions, and the coarse counter is reset to a quiescent position situated two units before zero setting as seen in the counting direction and the control circuit, in order to obtain the setting that the counter would have reached after the addition of $2n-1$ to the value stored after the completion of the counting and the switch over of all counter trigger circuits of the coarse counter includes means for leaving the trigger circuit storing the lowest bit in the coarse counter in the position reached, means controlling the switch over of the trigger circuit storing the lowest bit but one if the trigger circuit storing the lowest bit in this counter stores the value 1, means controlling a carry of a unit to the non-overlapping part of the coarse counter if at least one of the trigger circuits storing the lowest two bits in the coarse counter stores the value 1, and means controlling, after the above switching operations have been effected, the switch over of all trigger circuits in the non-overlapping part of the coarse counter.

5. Arrangement according to claim 3, wherein the counters comprise three overlapping positions and the coarse counter is reset to a quiescent position situated 4 units before zero setting before effecting a counting operation, and the control circuit, in order to obtain the setting of the coarse counter that it would have reached after the addition of $2n-1$ to the value stored after the counting operation and the switch over of the counter trigger circuits, includes means leaving the trigger circuit storing the lowest bit in the overlapping part of the coarse counter in the position reached, means controlling the switch over of the trigger circuit storing the lowest bit but one of the trigger circuit storing the lowest bit stores the value 1, means controlling the switch over of the trigger circuit storing the lowest bit but two in the coarse counter if at least one of the trigger circuits storing the lowest two bits stores the value 1, means controlling a carry of a unit to the non-overlapping part of the coarse counter if at least one of the trigger circuits in the overlapping part of the coarse counter stores the value 1, means controlling, after the above switching operations have been effected, the switch over of all trigger circuits in the non-overlapping part of the coarse counter.

References Cited
UNITED STATES PATENTS

| | | | |
|---|---|---|---|
| 3,024,986 | 3/1962 | Strianese et al. | 235—92 |
| 3,277,461 | 10/1966 | Selvin | 340—347 |
| 3,319,054 | 5/1967 | Kelling | 235—154 |

MAYNARD R. WILBUR, Primary Examiner

J. M. THESZ, Jr., Assistant Examiner

U.S. Cl. X.R.

340—347